(12) United States Patent
Thompson (10) Patent No.: US 9,365,247 B1
(45) Date of Patent: Jun. 14, 2016

(54) TAILGATE FOR EXTENDING THE BED OF A VEHICLE

(71) Applicant: Timothy Thompson, Saint Augustine, FL (US)

(72) Inventor: Timothy Thompson, Saint Augustine, FL (US)

( * ) Notice: Subject to any disclaimer, the term of this patent is extended or adjusted under 35 U.S.C. 154(b) by 0 days.

(21) Appl. No.: 14/862,871

(22) Filed: Sep. 23, 2015

Related U.S. Application Data (60) Provisional application No. 62/119,430, filed on Feb. 23, 2015.

(51) Int. Cl.
*B62D 33/00* (2006.01)
*B62D 33/08* (2006.01)
*B62D 33/027* (2006.01)

(52) U.S. Cl.
CPC ............ *B62D 33/08* (2013.01); *B62D 33/0273* (2013.01)

(58) Field of Classification Search
CPC ............................ B62D 33/08; B62D 33/0273
USPC ............... 296/26.08, 26.09, 26.1, 26.11, 57.1
See application file for complete search history.

(56) References Cited

U.S. PATENT DOCUMENTS

| | | | | |
|---|---|---|---|---|
| 6,142,548 A * | 11/2000 | Kuhn | ................. | B62D 33/0273 296/26.1 |
| 6,364,392 B1 * | 4/2002 | Meinke | .............. | B62D 33/0273 296/26.1 |
| 6,550,841 B1 * | 4/2003 | Burdon | ..................... | B60P 3/40 296/26.11 |
| 2009/0273202 A1 * | 11/2009 | Heaman | ............. | B62D 33/0273 296/26.1 |

* cited by examiner

*Primary Examiner* — Joseph D Pape
(74) *Attorney, Agent, or Firm* — Jay P. Hendrickson (57) ABSTRACT

A tailgate for extending the length of the bed of a vehicle, with the tailgate comprising a tailgate panel that is rotatably and slidably connected to a tailgate housing, enabling the tailgate panel to be rotated into and upright position, thereby extending the length of the bed of the vehicle by the height of the tailgate panel, and by extending the bed of the vehicle further by sliding the upright tailgate panel away from the tailgate housing.

3 Claims, 8 Drawing Sheets

TAILGATE FOR EXTENDING THE BED OF A VEHICLE

PRIORITY

This application relates to and claims the benefit under 35 U.S.C. §119(e) of U.S. Provisional Application No. 62/119,430 filed on Feb. 23, 2015.

TECHNICAL FIELD

This application relates to devices and methods for extending the length of a bed of a vehicle, and more specifically to extending the length of the bed of a truck.

BACKGROUND

Although tailgate extension devices and methods utilized to extend the bed of a vehicle are well known in the art, most of those devices and methods disclose modifications to the external structure and appearance of the tailgate and/or the vehicle. In addition, the prior art is generally limited to disclosing that the bed of the vehicle can be extended only by a fixed distance, rather than a variable distance. The tailgate of the present invention overcomes the limitations in the prior art by providing a tailgate in which the structure and mechanisms used to extend the bed of the vehicle are all contained within the tailgate itself. As a result, the tailgate looks just like a normal tailgate that does not provide the ability to extend the bed of a vehicle as described herein. The tailgate of the present invention also overcomes the prior art limitation of only extending the bed of a vehicle by a fixed amount.

SUMMARY OF THE INVENTION

A tailgate is described that can be used to extend the bed of a vehicle, with the tailgate comprising: A tailgate for extending the bed of a vehicle, comprising: a tailgate housing adapted for connection to the bed of the vehicle; an elongate cap member rotatably connected to the tailgate housing; a tailgate panel having a predetermined height; a plurality of elongate support members slidably disposed within the tailgate housing, with an end of each elongate member rotatably connected to the tailgate panel, thereby rotatably and slidably connecting the tailgate panel to the tailgate housing; and whereby the bed of the vehicle can be extended by rotating the tailgate panel around its rotatable connection to the tailgate housing to an upright position, with the bed of the vehicle being extended by a fixed distance approximately equal to the predetermined height of the tailgate panel, and whereby the bed of the vehicle can be extended further by pulling the upright tailgate panel in a direction away from the tailgate housing, causing the plurality of elongate members to slide out of the tailgate housing and simultaneously causing the tailgate panel to extend away from the tailgate housing, thereby further extending the length of the bed of the vehicle by a variable distance.

A method for using the tailgate to extend the bed of a vehicle is also disclosed, with the method comprising: rotating the tailgate to a position that is approximately level with the bed of the vehicle; rotating an elongate cap member to an open position; rotating a tailgate inner panel to an upright position approximately perpendicular to the bed of the vehicle, thereby extending the bed of the vehicle by a fixed distance approximately equal to the height of the tailgate inner panel; and sliding the upright tailgate inner panel away from the bed of the vehicle, thereby further extending the bed of the vehicle by a variable distance away from the bed of the vehicle.

DETAILED DESCRIPTION OF THE INVENTION

Figure 1:
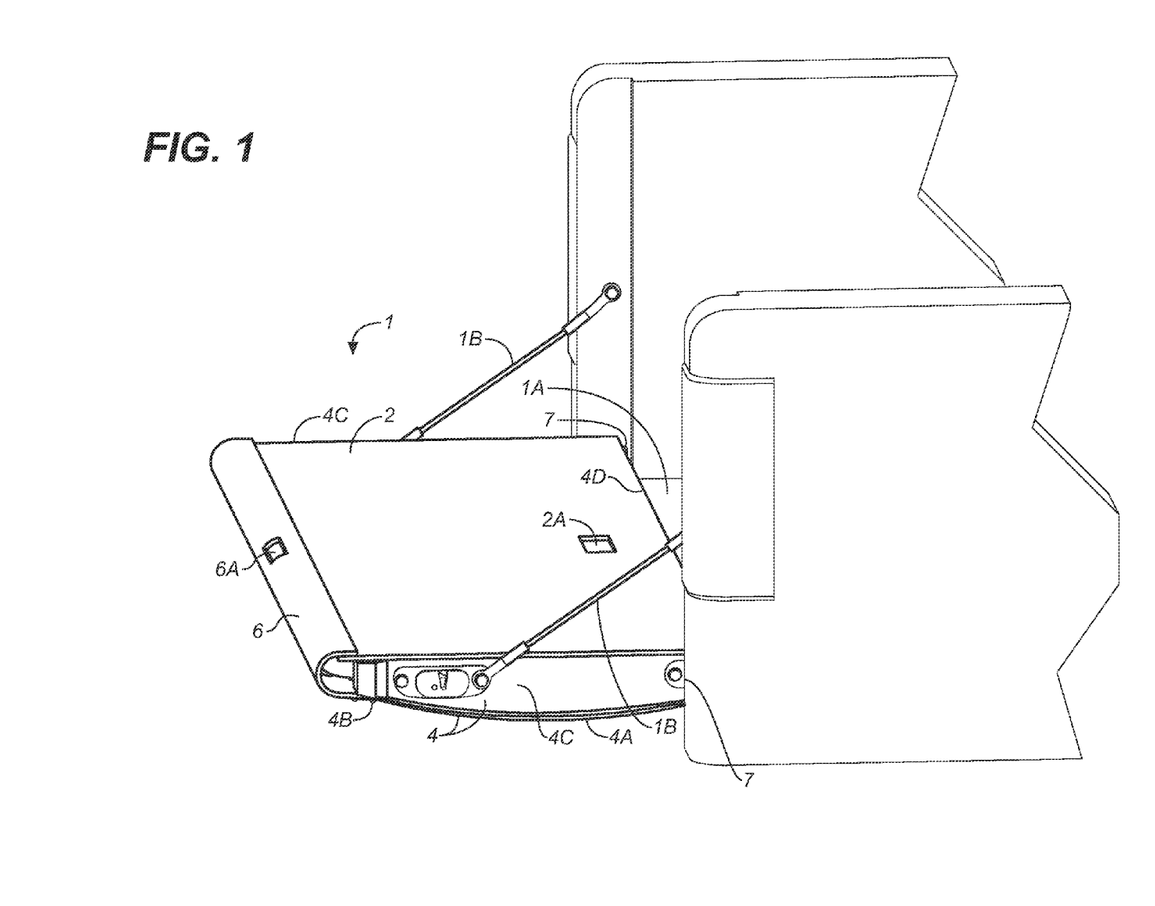
FIG. 1 is a perspective view of a tailgate of a vehicle in an open and rotated position, relative to the connection of the tailgate to the bed of the vehicle.

A tailgate 1 for extending the bed of a vehicle is illustrated in FIG. 1 through FIG. 7. FIG. 1 illustrates the tailgate 1 after its connection to the bed of the vehicle 1A has been opened and the tailgate 1 has been rotated down to a position that is approximately level with the bed of the vehicle 1A and maintained in that position by a pair of support wires 1B. The tailgate 1 comprises: a tailgate housing 4 having tailgate outer panel 4A, an outer panel top end 4B, a pair of opposing tailgate sides 4C integral with the tailgate outer panel 4A, a tailgate bottom panel 4D integral with the tailgate outer panel 4A and the pair of opposing tailgate sides 4C; a tailgate inner panel 2 having a predetermined height, with the tailgate inner panel 2 having an integral handhold panel cavity 2A; an elongate cap member 6 rotatably connected to the outer panel top end 4B, with the elongate cap member 6 having an integral handhold cap member cavity 6A; and a pair of hinges 7 that rotatably connect the tailgate 1 to the bed of the vehicle 1A.

Figure 2:
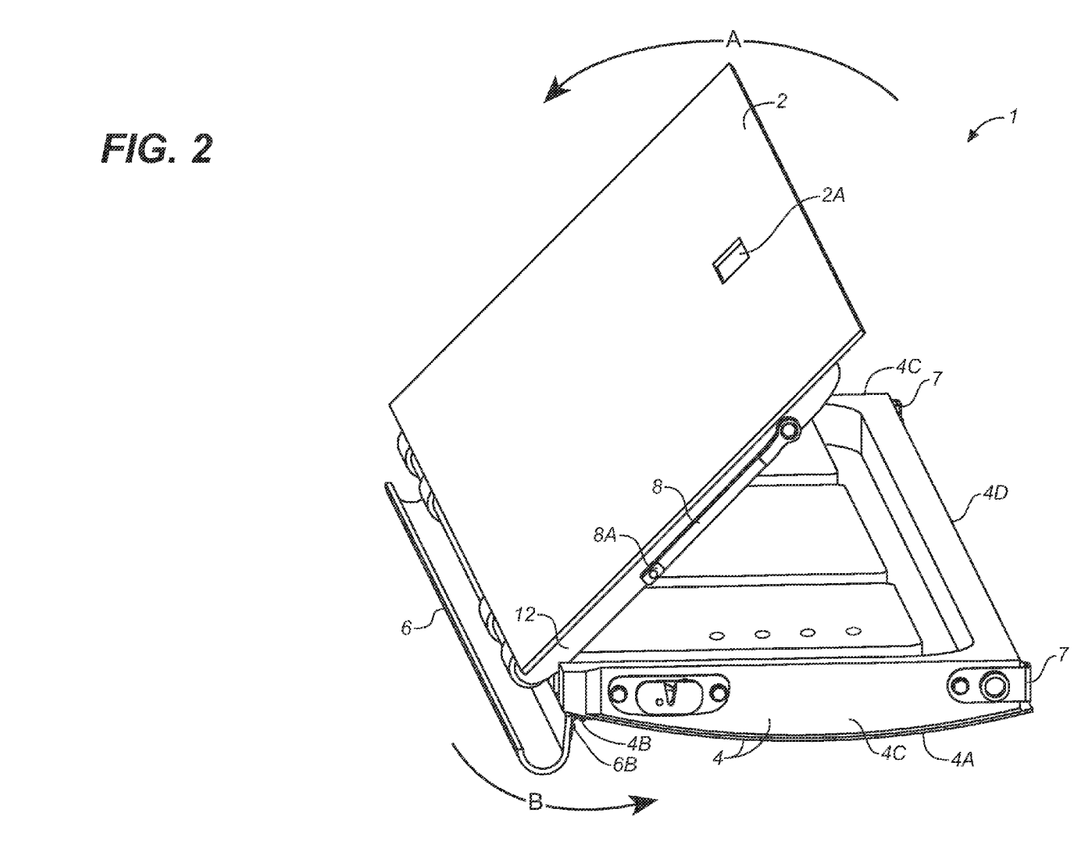
FIG. 2 is a perspective view of the tailgate, with a tailgate inner panel in a partially rotated position.

The directional "arrow" A in FIG. 2 illustrates that the tailgate inner panel 2 can be lifted to an open position by gripping the handhold panel cavity 2A and pulling the tailgate inner panel 2 in a direction generally away from the tailgate housing 4, which causes the tailgate inner panel 2 to rotate around a rotatable assembly as described in more detail below in connection with the illustrations presented in FIG. 4 through FIG. 7. Before lifting and rotating the tailgate inner panel 2, however, the elongate cap member 6 must be rotated to an open position, as illustrated by directional "arrow" B in FIG. 2, around a rotatable connection to the outer panel top end 4B of the tailgate outer panel 4A. The rotation is accomplished by gripping the handhold cap member cavity 6A and pulling the elongate cap member 6 away from the outer panel top end 4B of tailgate outer panel 4A, causing the elongate cap member 6 to rotate around a hinged connection 6B to the outer panel top end 4B of tailgate outer panel 4A in the direction of "arrow" B. FIG. 2 also illustrates a stabilizing rod 8 that is rotatably connected at one end to a rectangular tubular structure 12 that is attached to the tailgate inner panel 2 as described in more detail in connection with FIG. 3 through FIG. 6. And, in a preferred embodiment, the stabilizing rod 8 can be paired with another stabilizing rod 8 that is similarly rotatably connected at one end to an opposite side of the tubular structure 12 connected to the tailgate inner panel 2. The stabilizing rod 8 can comprise two rod segments that are connected by a rod hinge 8A that allows the stabilizing rod 8 to be extended in order to attach the stabilizing rod 8 to the vehicle.

Figure 3:
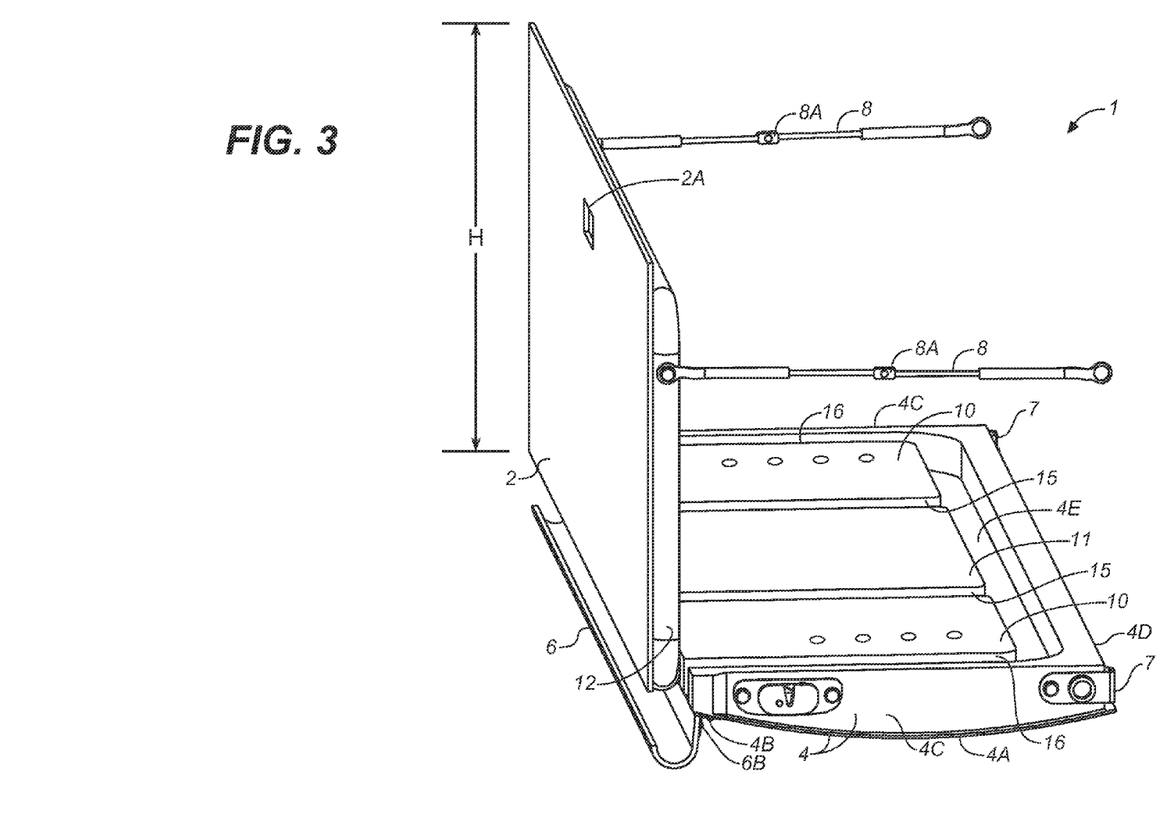
FIG. 3 is a perspective view of the tailgate, with the tailgate inner panel rotated upward to an upright position.

FIG. 3 illustrates the tailgate inner panel 2 that has been rotated further around the rotatable assembly to an upright position, approximately perpendicular to the bed of the vehicle 1A. Preferably, the pair of stabilizing rods 8 can be used to maintain the tailgate inner panel 2 in the upright position by releasably attaching an unconnected end of each stabilizing rod 8 to the vehicle. With the tailgate inner panel 2 in the upright position, the bed of the vehicle 1A can be extended by a distance approximately equal to the height "H" of the tailgate inner panel 2 as shown in the figure. And, if the tailgate inner panel 2 is not secured in an upright position, FIG. 4 illustrates that tailgate inner panel 2 can be rotated even further in a downward direction to an inverted position.

FIG. 3 through FIG. 7 further illustrate that the tailgate 1 comprises a pair of outer enclosures 10, and a middle enclosure 11 positioned between the pair of outer enclosures 10, with all of the enclosures attached to an inside surface 4E of the tailgate outer panel 4A, and with each outer enclosure 10 out of the pair of outer enclosures 10 having an enclosure open end 9 adjacent to the outer panel top end 4B of the tailgate outer panel 4A, with the enclosure open end 9 providing access to an open passageway within each outer enclosure 10. The middle enclosure 11 is further positioned so as to create a pair of inner channels 15 that separate the middle enclosure 11 from the pair of outer enclosures 10, and the pair outer enclosures 10 are positioned so as to create a pair of outer channels 16 that separate each outer enclosure 10 from an inside surface of a corresponding tailgate side 4C.

Figure 4:
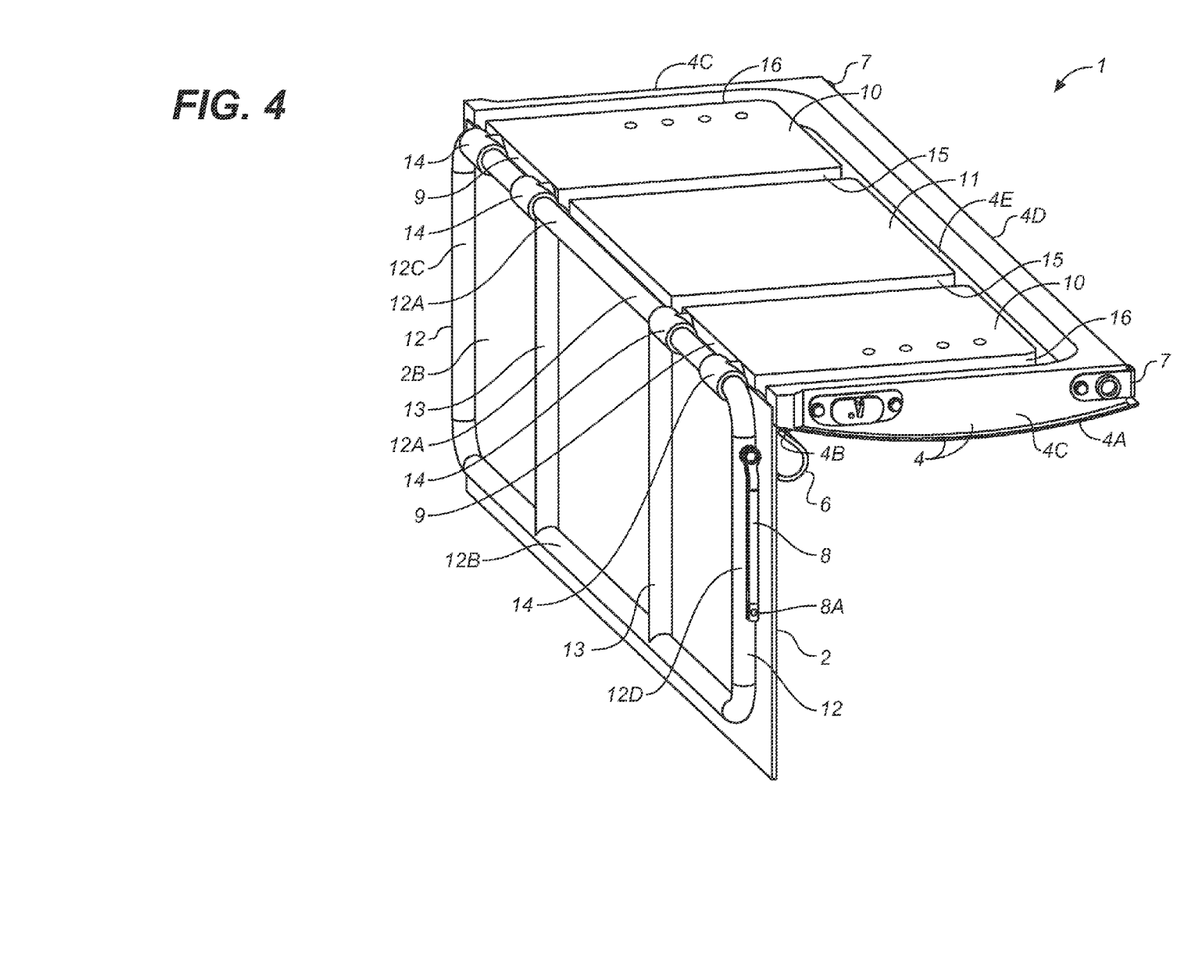
FIG. 4 is a perspective view of the tailgate, with the tailgate inner panel rotated downward to an inverted position
Figure 6:
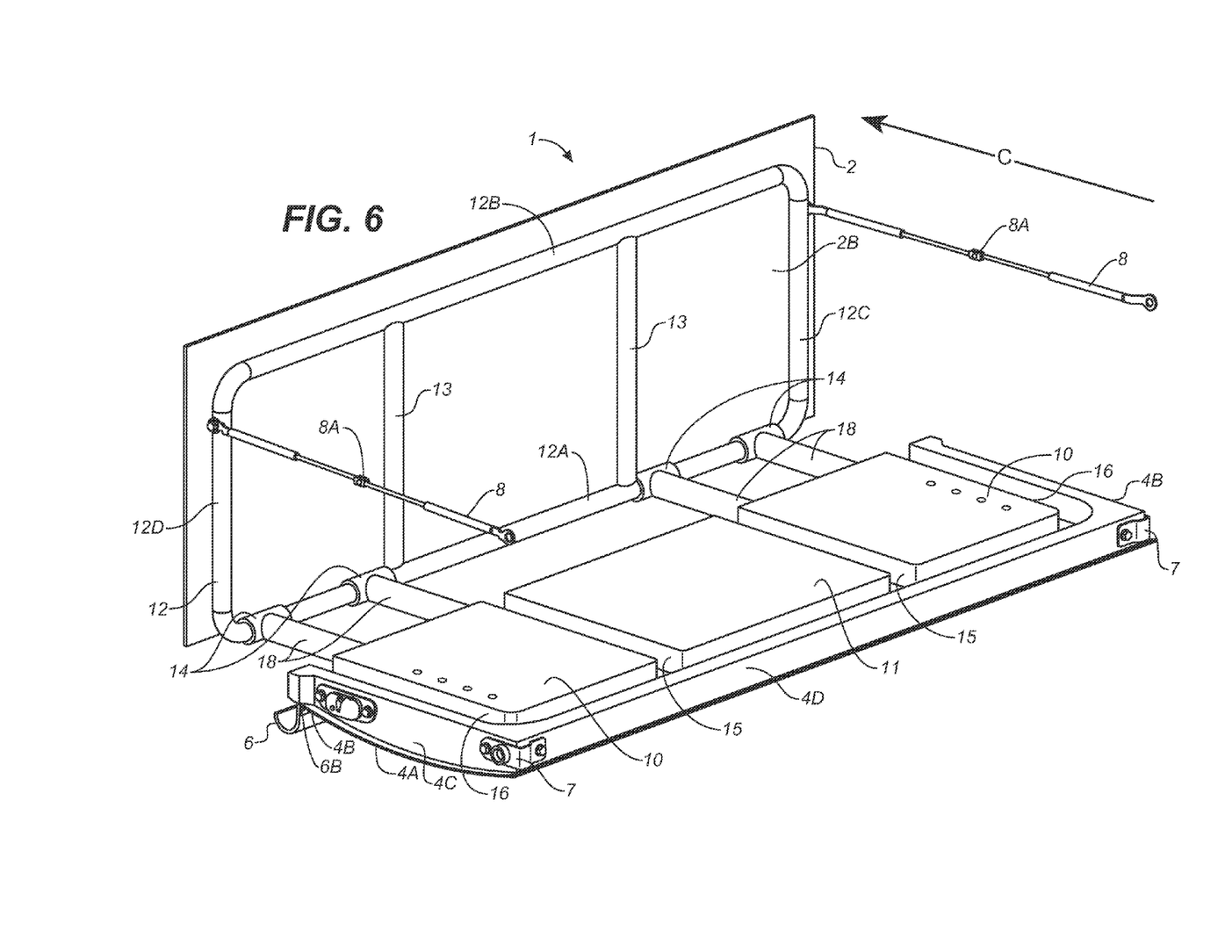
FIG. 6 is another perspective view of the tailgate illustrated in FIG. 5, with the tailgate inner panel rotated to an upright position and pulled in an approximately horizontal away from the bed of the vehicle.

As best shown in FIG. 4 and FIG. 6, the rectangular tubular structure 12 is attached to an inside surface 2B of the tailgate inner panel 2, with the rectangular tubular structure 12 having four outer tubular segments, 12A, 12B, 12C, and 12D, disposed around the perimeter of the inside surface 2B of the tailgate inner panel 2, and with a pair of inner tubular segments 13 disposed within the rectangular tubular structure 12 such that an end of one inner tubular segment out of the pair of tubular segments 13 is attached to the outer tubular segment 12A and the other end is attached to the outer tubular segment 12B, and an end of the other inner tubular segment out of the pair of inner tubular segments 13 is attached to the outer tubular segment 12A and the other end is attached to the outer tubular segment 12B. The outer tubular segment 12A of the rectangular tubular structure 12 is positioned adjacent to the enclosure open ends 9 within the pair of outer enclosures 10, with a pair of rotatable sleeves 14 disposed around corresponding ends of the tubular segment 12A. And, as more specifically shown in FIG. 4 and FIG. 6, the stabilizing rod 8 can be rotatably attached at one end to outer tubular segment 12D of tubular structure 12. And, in a preferred embodiment, the stabilizing rod 8 can be paired with another stabilizing rod 8 similarly rotatably connected at one end to tubular segment 12C of the tubular structure 12.

Figure 5:
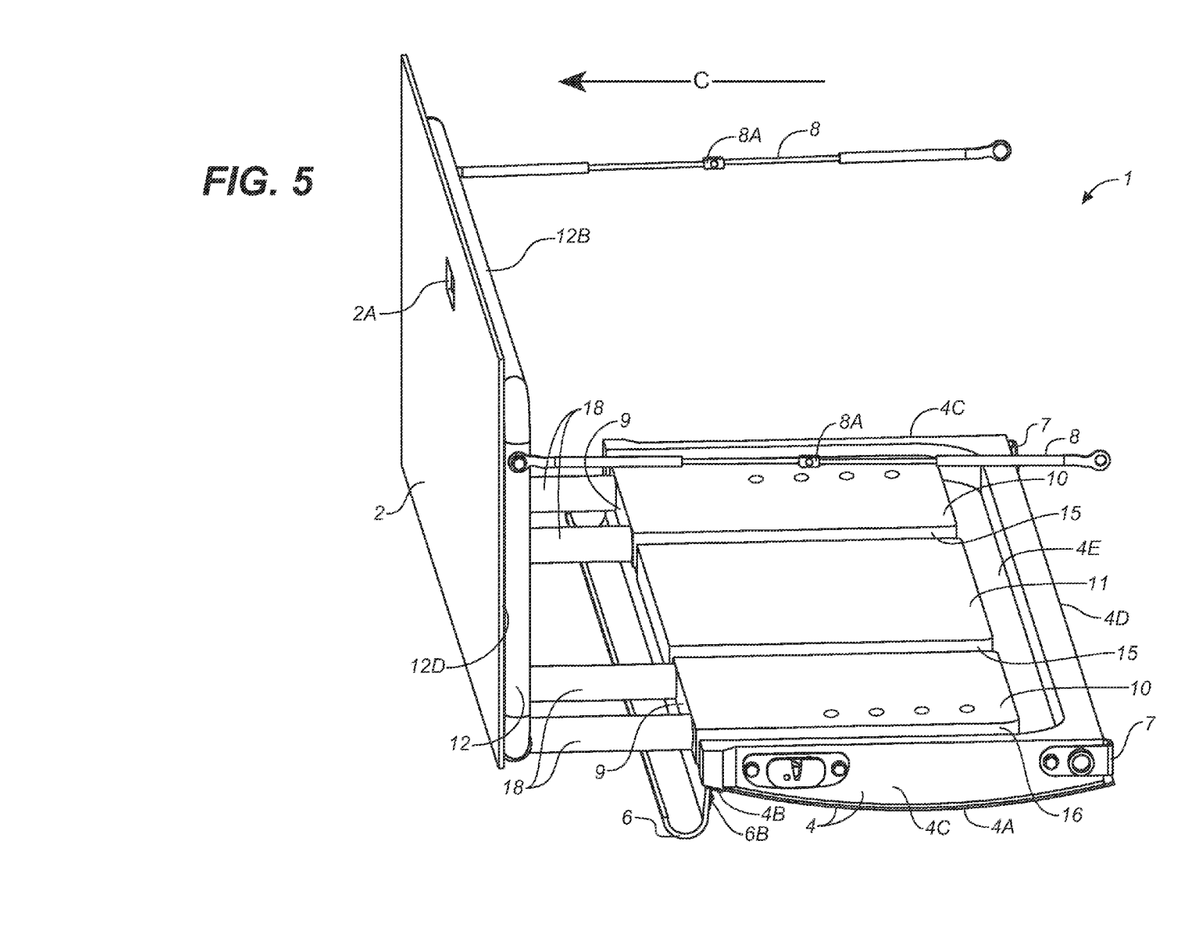
FIG. 5 is a perspective view of the tailgate, with the tailgate inner panel rotated to an upright position and pulled in a horizontal direction away from the bed of the vehicle.
Figure 7A:
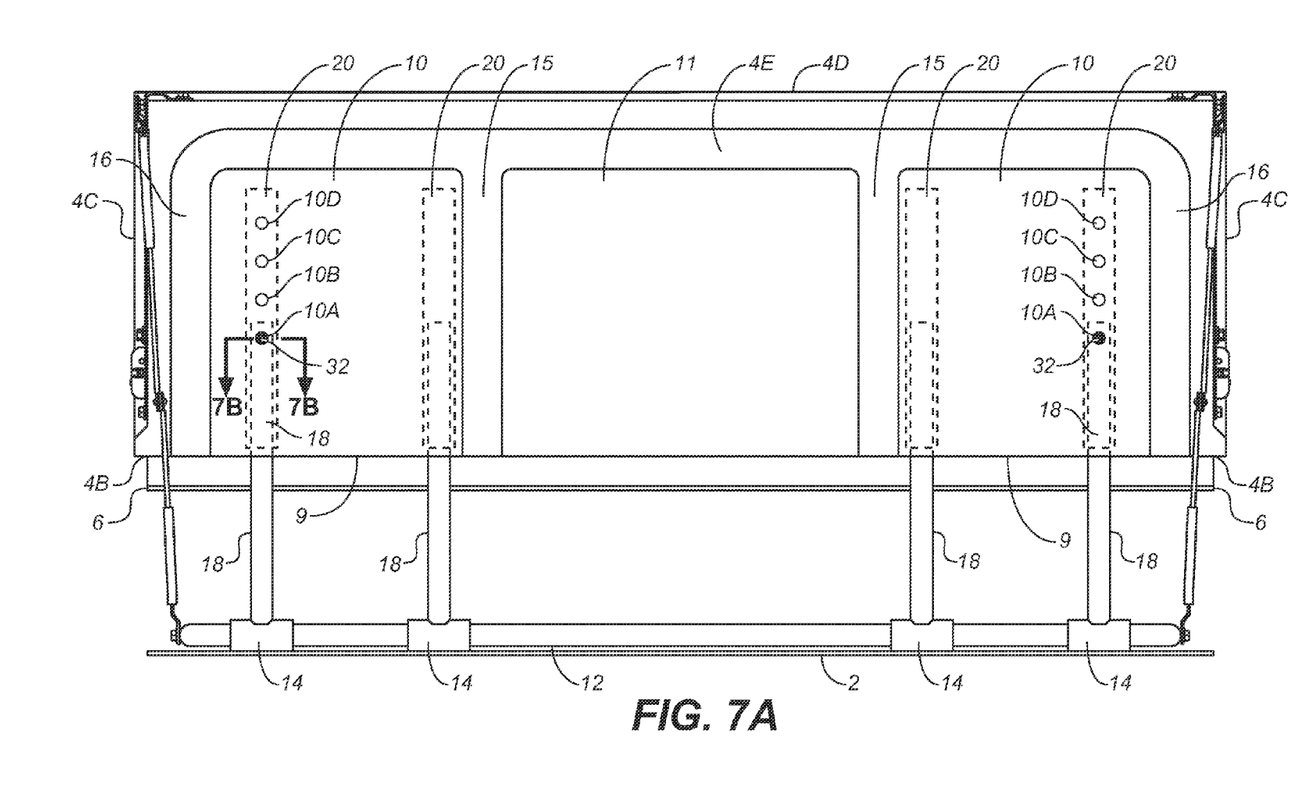
FIG. 7A is a top plan view of the tailgate illustrated in FIG. 5 and FIG. 6, with the tailgate inner panel rotated to an upright position and pulled in an approximately horizontal away from the bed of the vehicle.

As illustrated in FIG. 7A, two pairs of elongate guide members 20 (shown in dashed lines), with each guide member 20 preferably having a tubular shape, can be disposed within corresponding open passageways that are within corresponding outer enclosures 10, with the two pairs of elongate guide members 20 also attached to corresponding inside surfaces of the outer enclosures 10. Each elongate guide member out of the two pairs of elongate guide members 20 can be positioned within a corresponding open passageway such that an opening within one end of the each elongate guide member is adjacent to a corresponding enclosure open end 9. Two pairs of elongate support members 18, with each elongate support member 18 preferably having a tubular shape, can be disposed, as shown in FIG. 5 and FIG. 6, within corresponding outer enclosures 10 by slidably disposing the two pairs of elongate support members 18 within the corresponding two pairs of elongate guide members 20 (shown in additional dashed lines of FIG. 7) by passing the two pairs of elongate support members 18 through corresponding guide member openings. And, the two pairs of elongate support members 18 can be rotatably attached to the rectangular tubular structure 12 by connecting ends of the elongate members 18 to corresponding rotatable sleeves 14, which are rotatably disposed around outer tubular segment 12A within the rectangular tubular structure 12. In this regard, it is the connection of the two pairs of elongate support members 18 to the corresponding rotatable sleeves 14 that creates the rotatable assembly that allows the tailgate inner panel 2 to be rotated in the direction illustrated in FIG. 2. In addition, the tailgate inner panel 2 can be rotated around the rotatable assembly in the opposite direction until it is again positioned in a closed position as shown in FIG. 1. When the tailgate inner panel 2 is in the closed position, the outer tubular segments 12C and 12D, within the rectangular tubular structure 12, are disposed within the corresponding pair of outer channels 16, and the pair of inner tubular segments 13, within the rectangular tubular structure 12, is disposed within the corresponding pair of inner channels 15.

Figure 7B:
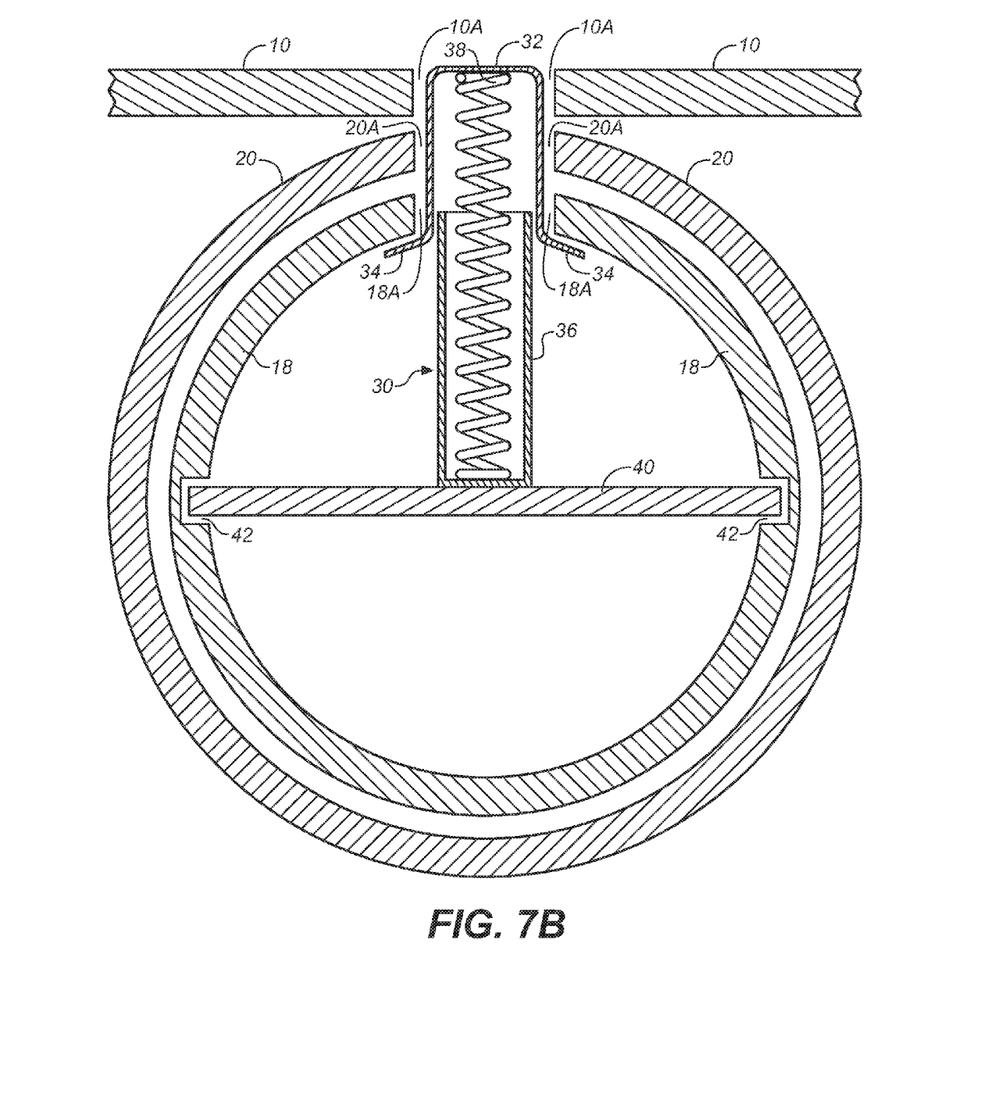
FIG. 7B is a cross-sectional illustration of a portion of FIG. 7A, providing a view in the direction indicated by the arrows 7B-7B in FIG. 7A.

The directional "arrow" C in FIG. 5 and FIG. 6 illustrates that the length of the bed of the vehicle 1A can be further extended by a predetermined and variable distance by pulling the upright tailgate inner panel 2, using handhold panel cavity 2A, in a direction away from the pair of outer enclosures 10, causing the two pairs of elongate support members 18 to slide part of the way out the corresponding pair of enclosures 10. And, FIGS. 7A and 7B illustrate in a preferred embodiment that the two pairs of the elongate support members 18 can be provided with a corresponding pair of locking assemblies 30 in order to releasably lock the two pairs of the elongate support members 18 into a predetermined number of variable positions relative to the corresponding two pairs of elongate guide members 20. More specifically, as illustrated in FIGS. 7A and 7B, one of the locking assemblies 30 out of the pair of locking assemblies 30 can be disposed within one of the elongate support members 18 out of one of the two pairs of elongate support members 18, and the other locking assembly 30 similarly can be disposed within another elongate support member 18 out of the other of the two pairs of elongate support members 18. Each locking assembly 30 comprises: a rectangular platform 40; a platform sleeve 36 attached at one end to the rectangular platform 40, with the platform sleeve 36 in a position that is approximately vertical to the rectangular platform 40; an elongate spring 38 disposed within the platform sleeve 36; a locking sleeve 32 having a closed top end, with the locking sleeve 32 disposed around the elongate spring 38, and with the locking sleeve 32 also having a flange 34 integral with a bottom perimeter of the locking sleeve 32, with the flange 34 extending in a radial direction away from the locking sleeve 32. Before the two pairs of elongate support members 18 are disposed with the corresponding two pairs of elongate guide members 20, one of the locking assemblies 30 out of the two pairs of locking assemblies 30 can be disposed within the inside of one of elongate support members 18 out of one of the two pairs of elongate support members 18 by sliding the rectangular platform 40 into a pair of axially extending and opposing grooves 42 formed within the inside surface of the elongate member 18. The locking assembly 30 is then positioned so as to concentrically align the top closed end of the locking sleeve 32 with an annular opening 18A within elongate member 18, causing the spring 38 within the locking sleeve 32 to extend the locking sleeve 32 through the annular opening 18A within the elongate member 18 until the flange 34 of the locking sleeve 32 contacts the inside surface of the elongate member 18, with the closed top end of the locking sleeve 32 extending a predetermined distance above the annular opening 18A. The other locking assembly 30 out of the pair of locking assemblies 30 can be similarly positioned within another elongate member 18 out of the other pair of the two pairs of elongate support members 18, causing the locking sleeve 32 to extend the same predetermined distance above the annular opening 18A within the another elongate member 18.

Once the pair of locking assemblies 30 are positioned within the corresponding elongate support members 18, the pair of locking assemblies 30 can be used to releasably lock the corresponding elongate support members 18 to corresponding elongate guide members 20. This can be accomplished by inserting the two pairs of elongate support members 18 into the corresponding two pairs of elongate guide members 20 and simultaneously depressing the locking sleeves 32 in order to allow the two pairs of elongate support members 18 to extend further into the corresponding two pairs of elongate guide members 20. As the two pairs of elongate tubes 18 are inserted a predetermined distance into the corresponding two pairs of elongate guide members 20, each locking sleeve 32 out of the pair of locking sleeves 32 will similarly engage an annular opening 20A within a corresponding guide member 20 and further engage another annular opening 10A within a corresponding outer enclosure 10, with the closed end of the locking sleeve 32, as shown in the figures, flush with an outer surface of the outer enclosure 10. In this manner the locking assembly 30 releasably locks the two pairs of elongate tubes 18 in a fixed position, which corresponds to the maximum distance that the upright tailgate inner panel 2 can be extended away from the bed of the vehicle 1A. If a lesser amount of extension is desired, the locking sleeves 32 can be depressed until the locking sleeves 32 no longer engage annular openings 20A and 10A, enabling the two pairs of elongate support members 18 to be further inserted into the corresponding two pairs of elongate guide members 20, until each locking assembly 30 similarly engages either annular openings 20B and 10B, 20C and 100, or 20D and 10D. In this fashion, the tailgate inner panel 2 can be positioned at four different distances away from the bed of the vehicle 1A. In a preferred embodiment, the length of the bed of the vehicle 1A can be extended, using the slidable and rotatable features described herein, just over eight feet that allows an eight by four foot sheet rock board to be placed flat on the bed of the vehicle 1A. In this regard, it will be apparent to persons skilled in the art that the variable tailgate extension described above could also be accomplished with elongate support members 18 that are hydraulically controlled within corresponding elongate guide members 20, thereby providing a continuously variable extension.

The tailgate 1 has many advantages over previous tailgate designs. A significant advantage is that all of the structure and mechanisms used to extend the bed of the vehicle 1A are either part of the tailgate 1 itself, like the tailgate inner panel 2 and the elongate cap member 6, or inside the tailgate, like the elongate support members 18 that are slidably and rotatably attached to structure within the tailgate 1. As a result, the tailgate 1 looks just like a normal tailgate that does not provide the ability to extend the bed of a vehicle. An equally important advantage is that the length of the bed of the vehicle 1A can be extended by an amount approximately equal to the height "H" of the tailgate inner panel 2 and can be extended further, if desired, by a variable amount. The ability to vary the amount of extension ensures that the bed of the vehicle 1A is extended no longer than necessary to carry the load and prevents the load from shifting during acceleration. And, the advantage of being able to rotate the tailgate inner panel 2 to an inverted position makes it easier to place items onto the bed of the vehicle 1A.

Although a preferred embodiment and other embodiments have been described, it will be recognized by those skilled in the art that other embodiments and features may be provided without departing from the underlying principals of those embodiments. The scope of the invention is defined by appended claims.

The invention claimed is:

1. A tailgate for extending the bed of a vehicle, comprising:
   a tailgate housing adapted for connection to the bed of the vehicle;
   an elongate cap member rotatably connected to the tailgate housing;
   a tailgate panel having a predetermined height; and
   a plurality of elongate support members slidably disposed within the tailgate housing, with an end of each elongate support member rotatably connected to the tailgate panel, thereby rotatably and slidably connecting the tailgate panel to the tailgate housing;
   whereby the bed of the vehicle can be extended by rotating the tailgate panel to an upright position, with the bed of the vehicle being extended by a fixed distance approximately equal to the predetermined height of the tailgate panel, and whereby the bed of the vehicle can be extended further by pulling the upright tailgate panel in a direction away from the tailgate housing, causing the plurality of elongate support members to slide out of the tailgate housing and simultaneously causing the tailgate panel to extend away from the tailgate housing, thereby further extending the length of the bed of the vehicle by a variable distance.

2. The tailgate as in claim 1 further comprising at least one stabilizing member connected at one end to the tailgate panel and adapted for connection at the other end to the vehicle, with the stabilizing member for maintaining the tailgate panel in an upright position.

3. A method for using a tailgate for extending the bed of a vehicle, comprising:
   rotating the tailgate to a position that is approximately level with the bed of the vehicle;
   rotating an elongate cap member to an open position;
   rotating a tailgate panel to an upright position, thereby extending the bed of the vehicle by a fixed distance approximately equal to the height of the tailgate panel; and
   sliding the upright tailgate panel away from the bed of the vehicle, thereby further extending the bed of the vehicle by a variable distance away from the bed of the vehicle.

* * * * *